United States Patent
Gramlich et al.

(10) Patent No.: US 9,174,503 B2
(45) Date of Patent: Nov. 3, 2015

(54) ENVIRONMENT ACTIVATED AUTOMATIC SHUT-OFF SWITCH SYSTEM AND METHOD

(75) Inventors: Don Gramlich, Madison, IN (US);
Timothy W. Brooks, Madison, IN (US);
Luigi Tavernese, Brantford (CA);
Giovanni Tavernese, Brantford (CA)

(73) Assignee: Grote Industries, Inc., Madison, IN (US)

(*) Notice: Subject to any disclaimer, the term of this patent is extended or adjusted under 35 U.S.C. 154(b) by 806 days.

(21) Appl. No.: 13/051,046

(22) Filed: Mar. 18, 2011

(65) Prior Publication Data

US 2011/0254381 A1 Oct. 20, 2011

Related U.S. Application Data

(60) Provisional application No. 61/315,222, filed on Mar. 18, 2010.

(51) Int. Cl.
| | |
|---|---|
| *H01H 35/02* | (2006.01) |
| *H01H 35/14* | (2006.01) |
| *B60D 1/62* | (2006.01) |
| *B60T 8/17* | (2006.01) |

(52) U.S. Cl.
CPC ................ *B60D 1/62* (2013.01); *B60T 8/1708* (2013.01); *B60T 2210/36* (2013.01); *Y10T 307/773* (2015.04)

(58) Field of Classification Search
CPC combination set(s) only.
See application file for complete search history.

(56) References Cited

U.S. PATENT DOCUMENTS

| | | | |
|---|---|---|---|
| 5,440,288 | A | 8/1995 | Gottlieb et al. |
| 5,488,352 | A | 1/1996 | Jasper |
| 5,510,763 | A | 4/1996 | Deckard et al. |
| 5,719,552 | A | 2/1998 | Thompson |
| 5,739,592 | A | 4/1998 | Rigsby et al. |
| 5,775,712 | A | 7/1998 | Link et al. |
| 5,929,532 | A | 7/1999 | Sell |
| 5,990,788 | A | 11/1999 | Syracuse |
| 6,051,931 | A | 4/2000 | Takei |

(Continued)

FOREIGN PATENT DOCUMENTS

| | | |
|---|---|---|
| DE | 100 63 802 A 1 | 7/2002 |
| DE | 101 60 750 A 1 | 6/2003 |

(Continued)

OTHER PUBLICATIONS

"Air-Weigh Declares Its Wirelink Multiplexing Protocol & Interface Circuitry Public Domain", News Release, Air-Weigh, Jan. 23, 1998.

(Continued)

*Primary Examiner* — Jared Fureman
*Assistant Examiner* — Aqeel Bukhari
(74) *Attorney, Agent, or Firm* — Woodard, Emhardt, Moriarty, McNett & Henry LLP

(57) ABSTRACT

An environment-activated automatic shut-off switch is disclosed. The disclosed embodiments allow power to be removed from a trailer auxiliary power circuit when the environment-activated automatic shut-off switch senses that the trailer is being put into motion. The disclosed embodiments of the environment-activated automatic shut-off switch do not require external control signals, such as those received from a vehicle tractor, in order to effectively control the trailer auxiliary power circuit and to ensure that the trailer ABS circuit has dedicated power while the trailer is in motion.

16 Claims, 3 Drawing Sheets

(56) References Cited

U.S. PATENT DOCUMENTS

| | | | |
|---|---|---|---|
| 6,089,588 | A | 7/2000 | Lesesky et al. |
| 6,127,939 | A | 10/2000 | Lesesky et al. |
| 6,130,487 | A | 10/2000 | Bertalan et al. |
| 6,512,452 | B1 | 1/2003 | Brannan et al. |
| 6,515,376 | B1 * | 2/2003 | Mederer ............... 307/10.1 |
| 6,799,814 | B2 | 10/2004 | Lesesky et al. |
| 6,879,251 | B2 | 4/2005 | Robbins et al. |
| 6,970,772 | B2 | 11/2005 | Radtke et al. |
| 7,106,182 | B2 | 9/2006 | De Wilde |
| 7,151,326 | B2 | 12/2006 | Jordan |
| 7,184,864 | B2 | 2/2007 | Bale et al. |
| 7,286,046 | B2 | 10/2007 | Kinsey et al. |
| 7,313,467 | B2 * | 12/2007 | Breed et al. ............... 701/1 |
| 2005/0073401 | A1 | 4/2005 | Currie |
| 2006/0267746 | A1 | 11/2006 | Kinsey et al. |
| 2008/0018439 | A1 | 1/2008 | Kinsey et al. |

FOREIGN PATENT DOCUMENTS

| | | |
|---|---|---|
| EP | 0 546 370 A1 | 6/1993 |
| EP | 0 692 396 A1 | 1/1996 |
| EP | 1 029 745 A2 | 8/2000 |
| EP | 1 186 510 A1 | 3/2002 |
| EP | 1 362 745 A2 | 11/2003 |
| GB | 1 439 384 | 6/1976 |
| GB | 2 399 467 A | 9/2004 |
| WO | WO 01/72555 A1 | 10/2001 |

OTHER PUBLICATIONS

"Hendrick Control-Link Offers Solution to Increase Communication Capacity of J560 Connector", Press Release, Hendrickson Vechicle Control Systems, Jan. 1998.

"Hendrickson Announces Vehicle Control Systems Group", Press Release, Hendrickson Vehicle Control Systems, Jan. 1998.

"Phillips Industries Introduces New PERMALOGIC Reefer", www.phillipsind.com, Jul. 31, 2007.

"'Smart' Trailer Experiment to Begin in November", Maintenance TMC, The Newsletter for Professional Truck Equipment Managers, vol. 6, No. 11, Nov. 1991.

"Trailers, ABS and Electricity: Getting Power Without the Blues", Trailer Body Builders, www.trailer-bodybuilders.com/mag/trucks_trailers_abs_electricity/index.html, Apr. 1, 1998, Printed: Nov. 15, 2007.

Atmel Corporation, "Automotive Lamp-outage Monitor IC", U479B, Rev. 4775B-Auto-09/05.

Cullen, David, "A face-off on communications: ABS warning light spurs industry action", FleetOwner, www.fleetowner.com/mag/fleet_faceoff_communications_abs/index.html, Apr. 1, 1998, Printed: Nov. 15, 2007.

Grote Industries Presentation to TMC Task Force S.1, Future Tractor-to-Trailer Communications Interface, Nashville, TN, Mar. 3, 1998.

Grote Industries Response to TTMA Questions for Providers of Tractor-Trailer Communication Systems, Jan. 19, 1998.

Grote Industries, "Multiplexing Through the Existing J560 Connector System on Class 8 Vehicles", Ultra-Plex, Multiplexing Information Report, Issue Mar. 30, 1997.

Grote Industries, Ultra-Plex Pamphlet, 1997.

Grote Industries: Product #44000—Gray, Trailer Air Switch Module, http://www.grote.com/cgi-bin/product.cgi?product_number=44000&mode=print (1 pg) Jun. 1, 2005.

Grote Industries: Product #44001—Gray, Trailer Air and Relay Switch Module, http://www.grote.com/cgi bin/product.cgi?product_number=44001&mode=print (1 pg.), Jun. 1, 2005.

Grote Industries: Product #44002—Gray, Trailer Relay Switch Module, http://www.grote.com/cgi bin/product.cgi?product_number=44002&mode=print (1 pg.), Jun. 1, 2005.

Grote Industries: Product #44240—Full Feature, Surface Mount, Electronic Dome Lamp Switch, http://www.grote.com/cgi bin/product.cgi?product_number=44240&mode=print (1 pg.). Jun. I, 2005.

Grote Industries: Product #44360—Electronic Brake Override Switch, Product Data Sheet, Jul. 2007.

Grote Industries: Product Catalog, UBS product, Wire Harness System, http://www.grote.com/prodcat/ubs/wire_harness.html, Nov. 7, 2007.

PLC4TRUCKS Presentation, Jan. 22, 1998.

Questions for Providers of Tractor-Trailer Communications Systems, Hendrick Vehicle Control Systems, 1998.

Roney et al., "Power Interval Communication Technology Over Turn Circuit", Society of Automotive Engineers, Inc., 1997.

Wissing, T.J. et al., "Development, Evaluation, and Demonstration of a Tractor Trailer Intelligent Communications and Power Link", U.S. Department of Transportation and Eaton Corporation, Final Report, Dec. 1996.

\* cited by examiner

ENVIRONMENT ACTIVATED AUTOMATIC SHUT-OFF SWITCH SYSTEM AND METHOD

CROSS-REFERENCE TO RELATED APPLICATION

The present application claims the benefit of U.S. Provisional Patent Application Ser. No. 61/315,222 filed Mar. 18, 2010, which is hereby incorporated by reference in its entirety.

FIELD OF THE DISCLOSURE

The present disclosure relates to electrical switches, and more particularly to an environment activated automatic shut-off switch.

BACKGROUND OF THE DISCLOSURE

Electrical power to a trailer pulled by a tractor is provided by connecting the tractor electrical power supply to a number of dedicated electrical circuits associated with the trailer, typically through an electrical connector on the front of the trailer commonly referred to as a "nosebox." Conventionally, the trailer includes dedicated circuits for the left-turn signal, right-turn signal, signal markers, taillights, stoplights, the antilock brake system (ABS) control circuit and ground. Tractor-trailer fleets have conventionally used the circuit adapted for use for powering the ABS control circuit for auxiliary applications, such as for providing power to interior trailer lights (e.g. so-called trailer "dome" lights), whenever the ABS control circuit is not to be utilized, such as when the trailer is parked. U.S. Regulation FMVSS 121 allows other lamp functions to use the ABS power line; however, the owner/operators of the vehicle have a responsibility to make sure the ABS braking system has the proper available amperage/voltage to operate properly when braking. The owners/operators therefore demand a system be implemented that will ensure that power is removed from the trailer auxiliary power circuit when the trailer is in motion.

Prior art systems for accomplishing this rely on signals transmitted from the tractor to the trailer to indicate when the trailer is in motion and, consequently, that power should be removed from the trailer auxiliary power circuit. For example, U.S. Pat. No. 5,739,592 entitled Power and Communications Link Between a Tractor and a Trailer requires a communication line between the tractor electrical system and the trailer electrical control module in order to control application of dedicated power to the ABS circuit. Similarly, U.S. Pat. No. 7,286,046 entitled Systems and Methods for Supplying Power to a Vehicle Trailer includes a module in the trailer that monitors the brake light signal from the tractor in order to determine when power may be supplied to the trailer auxiliary power circuit. These and other prior art systems therefore add complexity to the trailer by requiring additional wiring to allow monitoring of signals that indicate when the trailer auxiliary power circuit may be energized.

There is therefore a need for a system and method to ensure that power is removed from the trailer auxiliary power circuit when the trailer is in motion without requiring the coupling of external control signals to the controller. The present disclosure is directed toward systems and methods which meet this and other needs.

SUMMARY OF THE DISCLOSURE

An environment-activated automatic shut-off switch is disclosed. The disclosed embodiments allow power to be removed from a trailer auxiliary power circuit when the environment-activated automatic shut-off switch senses that the trailer is being put into motion. The disclosed embodiments of the environment-activated automatic shut-off switch do not require external control signals, such as those received from a vehicle tractor, in order to effectively control the trailer auxiliary power circuit and to ensure that the trailer ABS circuit has dedicated power while the trailer is in motion.

DESCRIPTION OF THE ILLUSTRATED EMBODIMENTS

Figure 1:
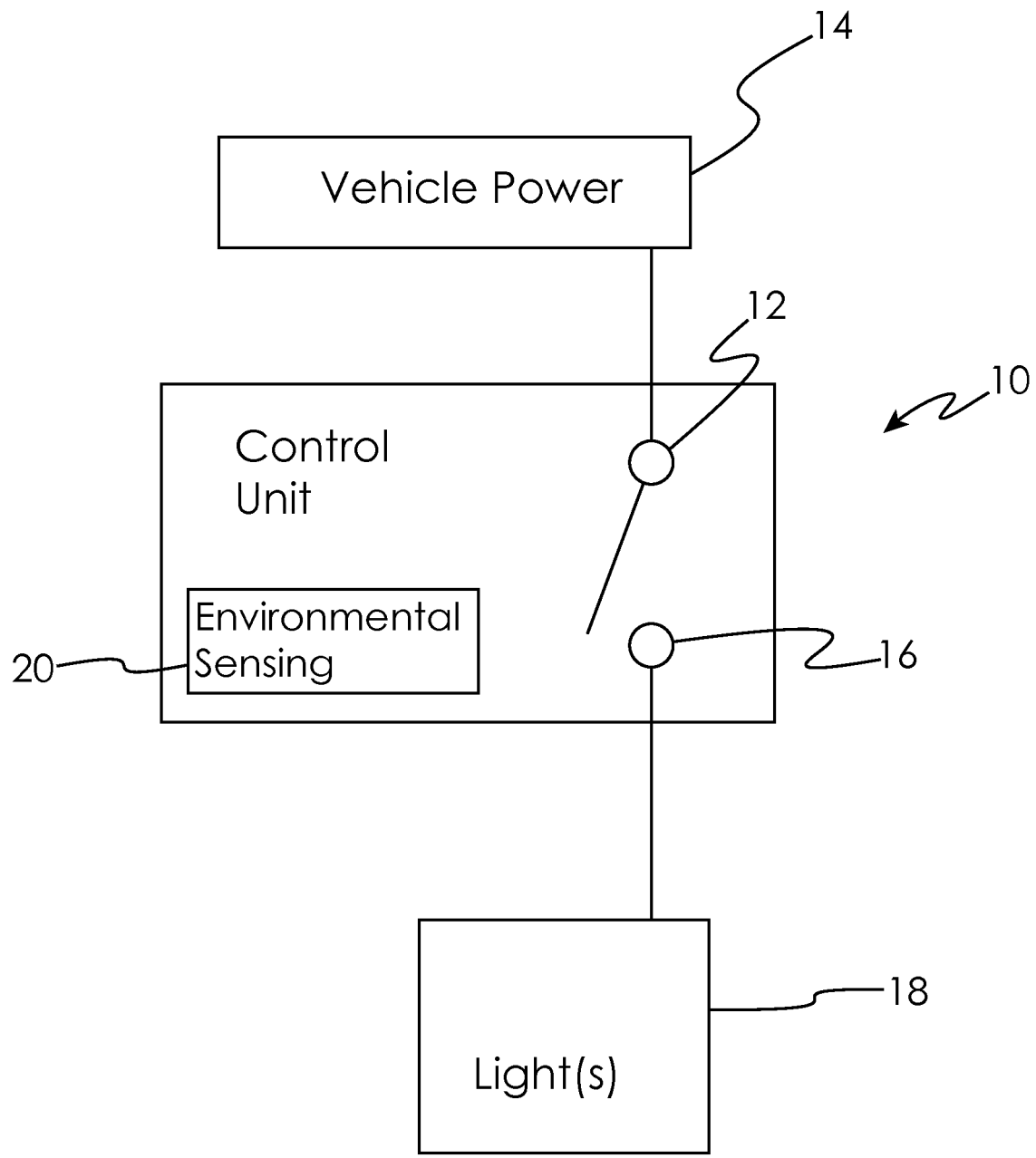
FIG. 1 is a schematic block diagram of an environment activated automatic shut-off switch according to one embodiment of the present disclosure.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, and alterations and modifications in the illustrated systems, and further applications of the principles of the disclosure as illustrated therein are herein contemplated as would normally occur to one skilled in the art to which the disclosure relates.

In certain embodiments, the present disclosure is directed to an environment-activated automatic shut-off switch.

In certain other embodiments, the present disclosure is directed to devices and methods that allow power to be removed from a trailer auxiliary power circuit when an environment-activated automatic shut-off switch senses that the trailer is being put into motion. The disclosed embodiments of the environment-activated automatic shut-off switch do not require external control signals, such as those received from a vehicle tractor, in order to effectively control the trailer auxiliary power circuit and to ensure that the trailer ABS circuit has dedicated power while the trailer is in motion.

Referring to FIG. 1, there is shown an example environment activated automatic shut-off switch indicated schematically at 10. An input 12 to the environment activated automatic shut-off switch 10 is coupled to a source 14 of vehicle power, while the output 16 is coupled to any of the vehicle lights 18. It will be appreciated by those skilled in the art that the environment activated automatic shut-off switch 10, while illustrated as a single pole, single throw (SPST) switch, may also be implemented in any switch configuration.

The environment activated automatic shut-off switch 10 includes an environmental sensor 20 either integrated therewith or operatively coupled thereto. The environmental sensor 20 is operative to sense changes in the switch 10's own environment, such as changes in the switch 10's own acceleration, velocity, position, etc. (as further detailed hereinbelow), as well as any motion of objects within the switch 10's general vicinity, which would indicate whether or not the switch 10 is in motion. It will be appreciated by those skilled in the art that the in the embodiment of FIG. 1 the environment activated automatic shut-off switch 10 may be used to control the application of power to any vehicle lighting system. For example, if it is desired that the vehicle headlights be illuminated any time that the vehicle is in motion, the environment activated automatic shut-off switch 10 may be used to achieve this goal by coupling the output 16 to the vehicle headlight circuit.

Figure 2:
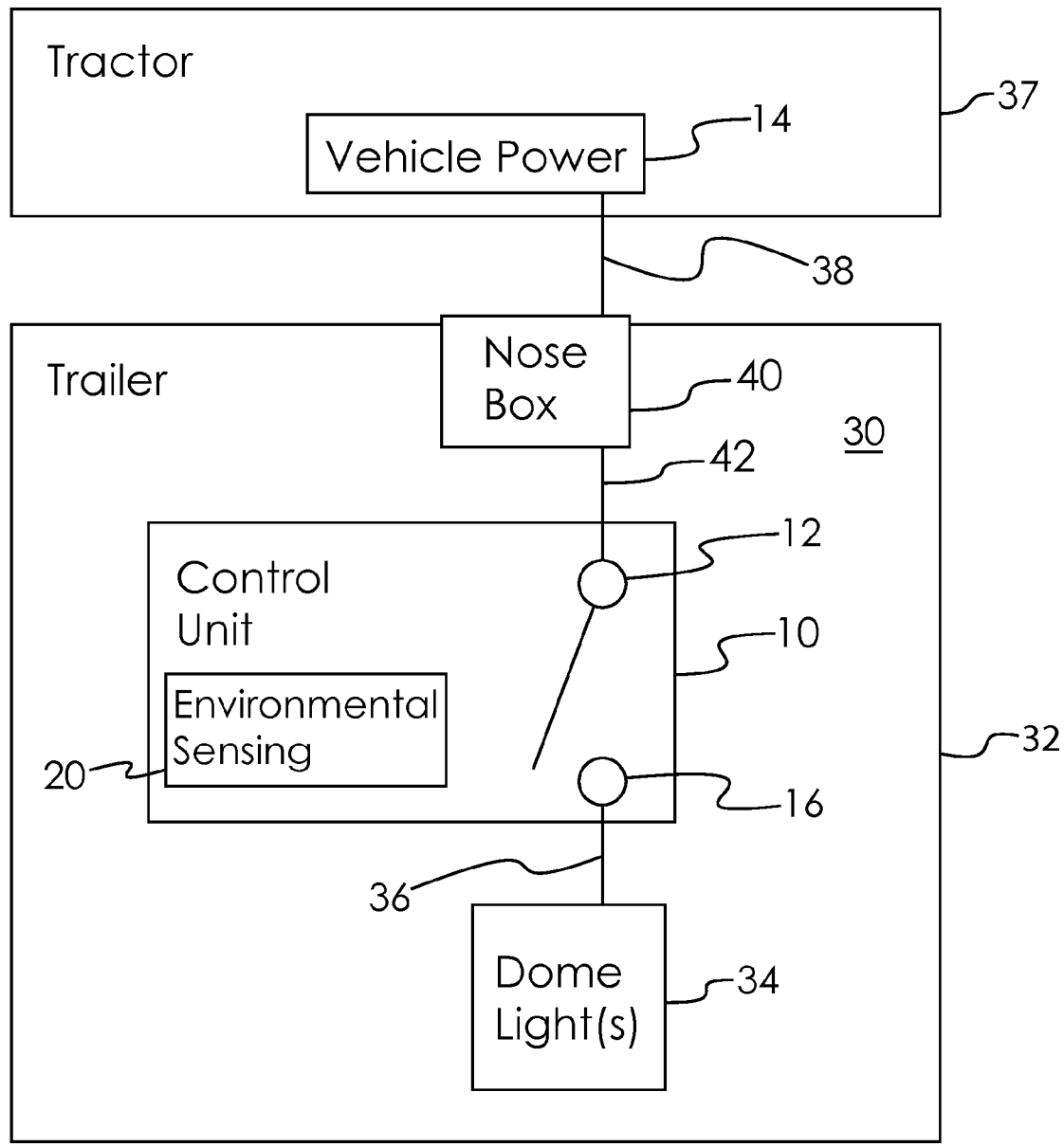
FIG. 2 is a schematic block diagram of an environment activated automatic shut-off switch according to another embodiment of the present disclosure.

Referring now to FIG. 2, in one embodiment, the environment activated automatic shut-off switch 10 may be mounted within the interior 30 of a trailer 32 such that the environment activated automatic shut-off switch 10 may be used to control application of power to trailer 32 interior dome lights 34 through control of the trailer auxiliary power circuit 36. In certain embodiments where the environment activated automatic shut-off switch 10 is used to control the auxiliary power circuit 36 of a trailer 32, the environment activated automatic shut-off switch 10, including the environment sensor 20, are located within and/or on the trailer.

The input 12 to the environment activated automatic shut-off switch 10 is coupled to vehicle power 14 from the tractor 37 through the electrical cable 38 that is commonly referred to as a "pigtail", the nose box 40 on the front of the trailer 32 to which the cable 38 is coupled, and trailer interior wiring 42. Note that in some embodiments, the trailer interior wiring 42 is simply the auxiliary power circuit, so no additional trailer wiring is required to use the environment activated automatic shut-off switch 10.

As can be seen from FIG. 2, the environment activated automatic shut-off switch 10 represents an improvement over the prior art devices used to control the auxiliary power circuit of a trailer in order to ensure dedicated power to the trailer ABS circuit while the vehicle is in motion, since the environment activated automatic shut-off switch 10 does not require connection to the vehicle tractor, or additional wiring to lines carrying information from the vehicle tractor, in order to properly control the trailer auxiliary power circuit. The environment activated automatic shut-off switch 10, incorporating the environment sensor 20, is self-contained and does not require information from external sources in order to properly control the trailer auxiliary power circuit and to provide dedicated power to the trailer ABS circuit while the vehicle is in motion. The presently disclosed embodiments therefore represent a substantial advancement in the art.

Figure 3:
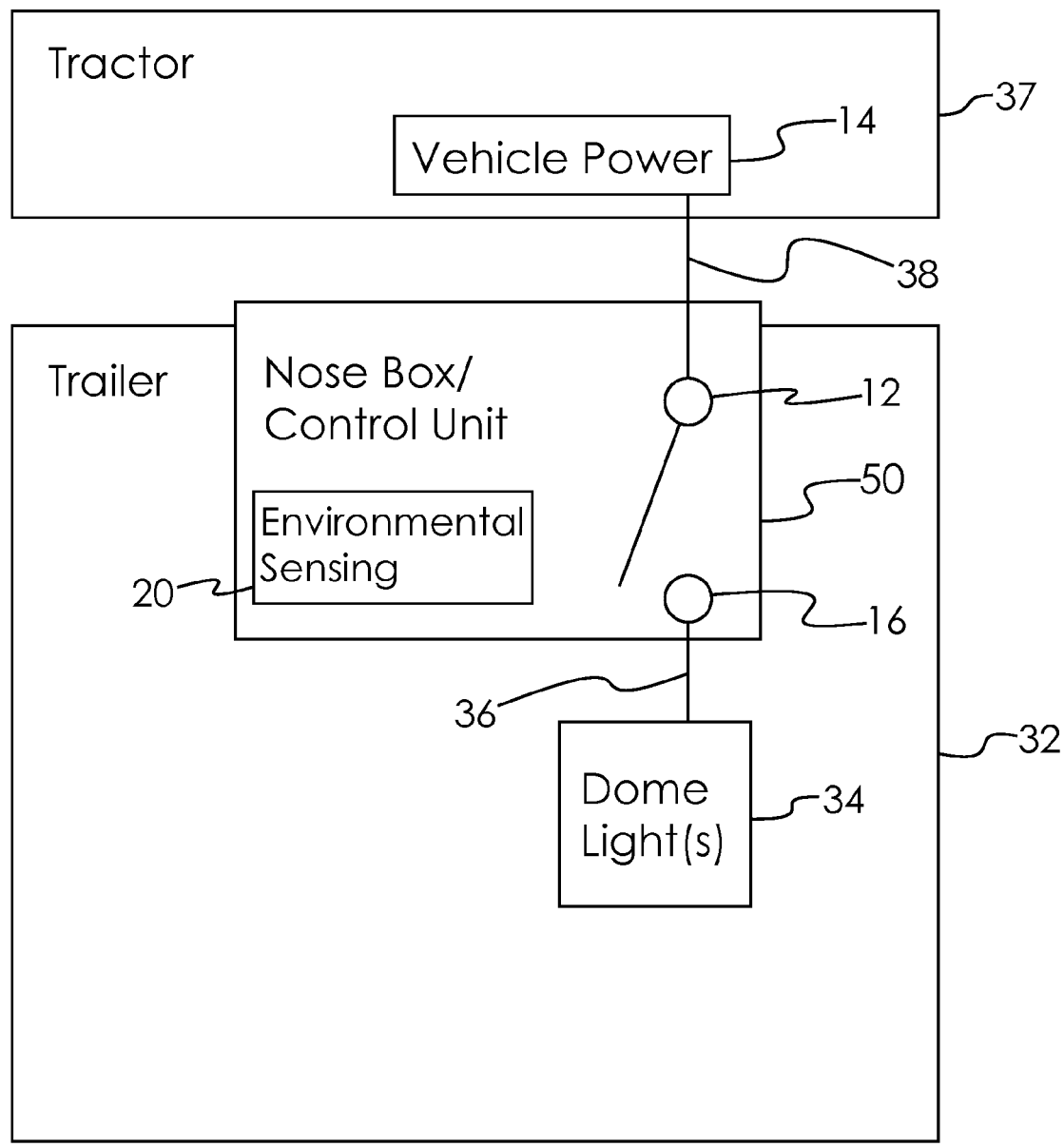
FIG. 3 is a schematic block diagram of an environment activated automatic shut-off switch according to another embodiment of the present disclosure.

Referring now to FIG. 3, a further embodiment of the environment activated automatic shut-off switch 10 is illustrated in which the environment activated automatic shut-off switch is integrated into the trailer 32 nose box, thereby forming a combination device 50. By incorporating the environment sensor 20 and the environment activated automatic shut-off switch 10 into the nose box 50, the wiring on the interior of the trailer 32 is further simplified.

In many applications, the dome lights 34 within the trailer 32 may be manually turned on by a user of the trailer 32, by use of a manual switch located in a convenient location, such as just inside the door of the trailer 32. While it is desirable to allow users to have control over the dome lights 34, it is not uncommon for users to leave the dome lights 34 illuminated even after the user no longer needs to access the interior of the trailer 32. This is a major reason why the U.S. federal regulations suggest that the ABS circuit (which shares power with the auxiliary power circuit due to the limited number of connecting wires between the tractor 37 and the trailer 32) have dedicated power when the vehicle is in motion. The various embodiments disclosed herein will automatically shut off the dome lights 34 whenever the vehicle is in motion.

In order to sense motion of the environment activated automatic shut-off switch 10, the environment sensor 20 may sense a variety of physical phenomena. In one embodiment, the environment sensor 20 may detect vehicular motion based upon the velocity and/or acceleration of a vehicle, such as a trailer 32. For example, the environment sensor 20 may comprise a tilt sensor, wherein the intention is not to tilt the tilt sensor, but rather to sense lateral acceleration that is overcoming the acceleration of gravity. In one embodiment, a tilt sensor switch DSBA1P (available from NKK Switches, 7850 E. Gelding Drive, Scottsdale, Ariz. 85260 USA) may be mounted to a circuit board that is tilted so that the tilt sensor will activate at a tilt angle of 11 degrees in the aft direction. This in turn provides an activation when the vehicle accelerates in the forward direction at 4.3 miles/(hour*second). As the angle is increased, the acceleration required of the vehicle to activate the sensor increases.

In another example, a vibration sensor may be used to sense vehicle motion, wherein a threshold level of vibration is indicative of the vehicle being in motion over a non-ideal surface. In one embodiment, the vibration sensor may comprise a vibration sensor Model SQ-SEN-200 (available from SignalQuest, Inc., 10 Water Street Lebanon, N.H. 03766 USA). In some embodiments, the output of the vibration sensor may be coupled to an input of a microprocessor and software code running on the microprocessor may use the output signal from the vibration sensor to determine if the vibration of the vehicle is over a predetermined threshold to indicate motion of the vehicle. In other embodiments, no microprocessor is used and the output of the vibration sensor is input to a hardware integrator to detect whether the desired threshold has been reached to make a determination that the vehicle is in motion.

In another example, change in vehicle velocity and/or acceleration may be sensed based upon reading from a global positioning system (GPS) monitor, or a cellular communications system that provides position information. In such a system, sequential data points relating to the position of the vehicle are compared to determine if the vehicle is in motion. In some embodiments, the change in velocity and/or acceleration determined from such data is compared to a threshold value in order to determine if the environment activated automatic shut-off switch 10 should be activated.

In other embodiments, the environment sensor 20 may detect changes in position or orientation of the vehicle, such as the trailer 32. For example, the environment sensor 20 may detect changes in the earth's magnetic field at the location of the environment sensor 20. In one embodiment, the environment sensor 20 detects such changes in the earth's magnetic field using an electronic compass, such as a HMR3200 (available from Honeywell International Inc., 21640N. 12$^{th}$ Ave., Phoenix, Ariz. 85027 USA).

In another example, the environment sensor 20 may detect changes in position or orientation of the vehicle, such as the trailer 32, based upon readings from a global positioning system (GPS) monitor, or a cellular communications system that provides position information. In such a system, sequential data points relating to the position of the vehicle are compared to determine if the vehicle is in motion. In some embodiments, the change in position or orientation determined from such data is compared to a threshold value in order to determine if the environment activated automatic shut-off switch 10 should be activated.

In another example, the environment sensor 20 may detect changes in position or orientation of the vehicle, such as the trailer 32, based upon readings from an anglular rate/gyroscope sensor, such as a model ARS-C122-1A (available from Watson Industries, Inc., 3041 Melby Road, Eau Claire, Wis. 54703 USA). Such solid-state angular rate sensors have a sensing mechanism consisting of piezoelectric bender elements in a "tuning fork" configuration. The drive elements are resonantly driven in opposite directions. When a rotation occurs, the momentum stored in the vibrating elements causes an out-of-plane bending force (called Coriolis force) that is demodulated to accurately represent the rotation rate. In some embodiments, the change in position or orientation determined from such data is compared to a threshold value in order to determine if the environment activated automatic shut-off switch 10 should be activated.

As discussed herein above, in many applications, the dome lights 34 within the trailer 32 may be manually turned on by a user of the trailer 32, by use of a manual switch located in a convenient location, such as just inside the door of the trailer 32. While it is desirable to allow users to have control over the dome lights 34, it is not uncommon for users to leave the dome lights 34 illuminated even after the user no longer needs to access the interior of the trailer 32. This is a major reason why the U.S. federal regulations require that the ABS circuit (which shares power with the auxiliary power circuit due to the limited number of connecting wires between the tractor 37 and the trailer 32) have dedicated power when the vehicle is in motion. The various embodiments disclosed herein will automatically shut off the dome lights 34 whenever the vehicle is in motion. In some vehicles, it is desired to automatically turn off the dome lights after they have been activated for more than a predetermined amount of time. For this purpose, it is known to incorporate a timer into the dome light 34 switching circuit that will automatically turn off the dome lights after they have been activated for more than a predetermined amount of time. One drawback to this design is that when the trailer 32 is being accessed by the user over an extended time period, the dome lights 34 may be extinguished while the user is inside the trailer 32.

Therefore, in some embodiments, the environment sensor 20 may detect motion of objects within the vehicle, such as the trailer 32. With such embodiments, the environment activated automatic shut-off switch 10 may incorporate functionality that will automatically turn off the dome lights 34 after no motion has been detected within the trailer 32 for a predetermined period of time. After such a period of time, it may be presumed that the interior of the trailer 32 is no longer being accessed by the user. For example, the environment sensor 20 may comprise a passive infrared sensor, such as model 555-28027 (available from Parallax, Inc., 599 Menlo Drive, Rocklin, Calif. 95765 USA).

As another example, the environment sensor may detect motion of objects within the vehicle, such as the trailer 32, by means of an ultrasonic sensor, such as model 28015 (available from Parallax, Inc., 599 Menlo Drive, Rocklin, Calif. 95765 USA). As a further example, environment sensor may detect motion of objects within the vehicle, such as the trailer 32, by means of a microwave motion sensor, such as model MDU2000 (available from Microwave Solutions Ltd., Hamilton House, 111, Marlowes, Hemel Hempstead, Hertfordshire HP1 1BB, England).

In some embodiments, the system and methods of the present disclosure may provide for a display that provides advance notification to the user of dome light 34 shutdown prior to deactivating the switch output 16. In some embodiments, such advance warning may be by means of a display showing the amount of time remaining before dome light 34 shutdown. Such a display may be incorporated into the environment activated automatic shut-off switch 10 or provided as a separate display unit. Other embodiments may provide an audible warning such as a buzzer, recorded or synthesized voice warning, and/or flashing light warning (including flashing of the dome lights 34). The time period after which the environment activated automatic shut-off switch 10 deactivates its output 16 may be preset and/or customer selectable. The environment activated automatic shut-off switch 10 may also be configured with multiple throws in order to control multiple zones of dome lights 34 according to multiple criteria. In some embodiments, the environment activated automatic shut-off switch 10 may disable the output 16 when a voltage on the input 12 is detected to be below a predetermined threshold value.

In some embodiments, the environment activated automatic shut-off switch 10 also includes the switching functionality that allows the user to manually turn on and/or turn off the dome lights 34 while accessing the inside of the trailer 32. Such switching functionality may be physically integrated into the environment activated automatic shut-off switch 10, or may be made by means of a remote switch input to the environment activated automatic shut-off switch 10. In further environments, the environment activated automatic shut-off switch 10 provides for a remote indicator that the dome lights 34 are illuminated, such as a signal light external to the trailer 32.

Short circuit detection/protection (i.e. overload protection) may also be provided. Short circuit detection/protection is the sensing of the current output of the environment activated automatic shut-off switch 10. If the load (e.g. the dome lights 34) draw too much current, it can be assumed that there is a system fault. This fault can be either a direct short to ground or a resistive short to ground.

One solution to short circuit detection/protection is to have a fuse in the environment activated automatic shut-off switch 10. This is short circuit protection in its simplest form. However, the fuse link is expensive and requires the customer to open the enclosure and replace the fuse if a fault occurs.

In other embodiments, this function can be performed electrically. The current out of the environment activated automatic shut-off switch 10 is sensed and if it is above a predetermined threshold, the circuit is shut down either via electrical circuitry or software being run by a microprocessor in the system. This same approach is used in open circuit detection. If the customer presses the button to activate the dome lights 34 and no current starts to flow, then it can be concluded that there is an open circuit. In both cases, a diagnostic response can be given to the customer. This can aid them in troubleshooting the system.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. An anti-lock brake power circuit for a vehicular trailer, comprising:
    a tractor separate from the trailer, wherein the trailer is configured to be coupled to the tractor;
    an environmental sensor operative to detect when the trailer has begun moving;
    an auxiliary power circuit in the trailer, the auxiliary power circuit configured to supply power to a light inside the trailer; and
    a shut-off switch operatively connected to the environmental sensor and the auxiliary power circuit, the shut-off switch operative to remove power from the auxiliary power circuit when the environmental sensor detects that the trailer has begun moving;
    wherein the environmental sensor and the shut-off switch are mounted on or within the trailer.

2. The power circuit of claim 1, wherein the environmental sensor is disposed within a nosebox of the trailer.

3. The power circuit of claim 1, wherein the environmental sensor comprises a vibration sensor.

4. The power circuit of claim 1, wherein the environmental sensor comprises a GPS monitor.

5. The power circuit of claim 1, wherein the environmental sensor comprises a tilt sensor.

6. The power circuit of claim 5, wherein the shut-off switch removes power from the power circuit when the tilt sensor measures the direction of acceleration to be about 11 degrees aft of vertical.

7. The power circuit of claim 1, further comprising a microprocessor, and wherein the microprocessor receives data from the environmental sensor and determines when to activate the shut-off switch.

8. The power circuit of claim 1, wherein the light is a trailer dome light.

9. The power circuit of claim 1, further comprising:
a timer;
wherein power to the light is removed when the timer reaches a predetermined time interval; and
wherein the timer is reset when the environmental sensor detects the trailer has begun moving.

10. The power circuit of claim 9, wherein power to the light is removed when the environmental sensor detects that the trailer has begun moving.

11. An anti-lock brake power circuit for a vehicular trailer, comprising:
a tractor separate from the trailer, wherein the trailer is configured to be coupled to the tractor;
an environmental sensor means for detecting when the trailer has begun moving;
an auxiliary power circuit in the trailer, the auxiliary power circuit configured to supply power to a light inside the trailer;
a shut-off switch that removes power from the auxiliary power circuit when the environmental sensor detects that the trailer has begun moving;
wherein the environmental sensor and the shut-off switch are mounted on or within the trailer.

12. The power circuit of claim 11, wherein the shut-off switch and the environmental sensor do not receive information from the tractor.

13. The power circuit of claim 11, wherein the environmental sensor means includes a vibration sensor.

14. The power circuit of claim 11, wherein the environmental sensor means includes a GPS monitor.

15. The power circuit of claim 11, wherein the environmental sensor means includes a tilt sensor.

16. The power circuit of claim 1, wherein the shut-off switch and the environmental sensor do not receive information from the tractor.

* * * * *